United States Patent [19]
N'Guyen
[11] Patent Number: 4,803,376
[45] Date of Patent: Feb. 7, 1989

[54] CONTROL METHOD FOR A REVERSIBLE MOTOR - GENERATOR ELECTRICAL MACHINE FOR A MOTOR VEHICLE AND CONTROL INSTALLATION FOR THE IMPLEMENTATION OF SUCH METHOD

[75] Inventor: Huu Can N'Guyen, Rueil Malmaison, France
[73] Assignee: Valeo, Paris, France

[21] Appl. No.: 89,393
[22] Filed: Aug. 26, 1987
[30] Foreign Application Priority Data
Sep. 11, 1986 [FR] France ............................ 86 12697
[51] Int. Cl.⁴ ..................... H02K 17/12; H02K 17/42
[52] U.S. Cl. ...................................... 290/22; 290/31
[58] Field of Search ............................ 290/45, 31, 22

[56] References Cited

U.S. PATENT DOCUMENTS

| | | | |
|---|---|---|---|
| 2,761,978 | 9/1956 | Piumi | 290/22 |
| 3,270,207 | 8/1966 | Stockton | 290/31 |
| 4,122,354 | 10/1978 | Howland | 290/31 |
| 4,293,756 | 10/1981 | Hoyt, Jr. et al. | 290/31 X |
| 4,616,166 | 10/1986 | Cooper et al. | 290/31 X |

FOREIGN PATENT DOCUMENTS

| | | |
|---|---|---|
| 2013189 | 3/1971 | Fed. Rep. of Germany . |
| 3113092 | 10/1982 | Fed. Rep. of Germany . |
| 2512406 | 3/1983 | France . |
| 59-185872 | 4/1983 | Japan . |
| WO8502886 | 4/1985 | PCT Int'l Appl. . |

*Primary Examiner*—William M. Shoop, Jr.
*Assistant Examiner*—W. E. Duncanson, Jr.
*Attorney, Agent, or Firm*—Cushman, Darby & Cushman

[57] ABSTRACT

The control method concerns a reversible electrical machine capable of working either as a generator (alternator) or as a motor intended for a motor vehicle, this machine comprising an armature winding (4) and an inductor winding (1), the inductor (1) being controlled by a regulator (2*a*) during operation in the alternator mode. During operation in the motor mode the supply voltage for the armature (4) and or the excitation (1) is controlled so as to obtain the desired torque-speed characteristics.

10 Claims, 7 Drawing Sheets

CONTROL METHOD FOR A REVERSIBLE MOTOR - GENERATOR ELECTRICAL MACHINE FOR A MOTOR VEHICLE AND CONTROL INSTALLATION FOR THE IMPLEMENTATION OF SUCH METHOD

The invention relates to a control method for a reversible electrical machine, that is to say a machine capable of operating either as a generator (alternator) or as a motor, intended for use in a motor vehicle, this machine comprising an armature winding and inductor winding, the inductor being controlled by a regulator capable of regulating the voltage delivered by the armature to the electric system of the vehicle, during operation as alternator.

The functioning of such an electrical machine in the motor mode corresponds either to its use as starter of this machine or to its use as a re-energising motor for an inertial flywheel in the case where the vehicle is equipped with a system for recovering energy by means of such a flywheel.

It is known that at present, the electric generator now usually an alternator, and the starter motor in most cars, tourist vehicles or heavy goods vehicles, constituted by two separate electrical machines. In the interest of economy and efficiency, an attempt is made to obtain a single electrical machine, capable of use sometimes as a generator (alternator), sometimes as a motor (a starter or as a re-energising motor for an intertial flywheel) and which ensures adequate performance for both types of operation.

The requirement relating to adequate performance is difficult to satisfy, because the electrical operating conditions are not the same when the machine is operating as a generator or as a motor.

The principal objective of the invention is to introduce a reversible electrical machine, as defined above, which meets the various practical requirements better than hitherto and which, in particular, makes it possible to obtain a satisfactory performance and efficiency both during operation as a generator and during operation as a motor.

According to the invention, the method for controlling a reversible electrical machine, which is capable of operating either as a generator (alternator) or as a motor, intended for use in a moator vehicle, this machine comprising an armature winding and inductor winding, the inductor being controlled during operation as an alternator by a regulator capable of regulating the voltage delivered by the armature to the electrical system of the vehicle, is characterised in that, for operating as a motor, the supply voltage for the armature and/or the excitation is controlled in order to obtain the desired torque-speed characteristics.

In the case of operating as a start-motor, it is advantageous to establish from the battery voltage a regulated voltage higher than that of the battery, this regulated voltage being used at least for the armature supply. The inductor can also be supplied by this regulated voltage.

When operation in the motor mode includes the reenergising of an inertial fly-wheel, the excitation of the inductor is advtangeously controlled so as to produce an increase in the speed of rotation at which the motor torque is cancelled.

It is preferable for this excitation to be controlled so as to obtain a maximum torque for each speed of rotation.

In general, the excitation is operated from a given speed $\omega 1$ chosen such that $\omega 1 = U/2K1$ where U is the supply voltage for the armature and K1 is the coefficient relating the counter electromotive force to the speed of rotation.

During operation in the motor mode, it is advantageous to regulate the armature in such a way as to limit the intensity of the current flowing in this armature to a predetermined value for rotational speeds, ranging from zero speed to a limit value.

Preferably, the intensity of the armature current is maintained at a constant value over the entire speed range.

Such a control method is particularly suitable for an electrical machine whose armature comprises several phases, and whose operation as a motor is accomplished by electronic switching.

The invention also relates to an electrical machine capable of being controlled using the above method and comprising connection means in the generator position and motor position, as well as means for controlling the supply voltage for the armature and/or of the regulator arranged to obtain the desired characteristics.

Advantageously the installation for the implementation of the method comprises connection means in the generator position and the motor position, control means and current sensors, as well as an electronic control module which controls the armature and inductor currents in order to obtain the desired characteristics.

Apart from the considerations set out above, the invention consists of a certain number of other arrangements which will be discussed more explicitly below with regard to particular modes of embodiment, described with reference to the attached drawings, but which are in no way restrictive.

Figure 9:
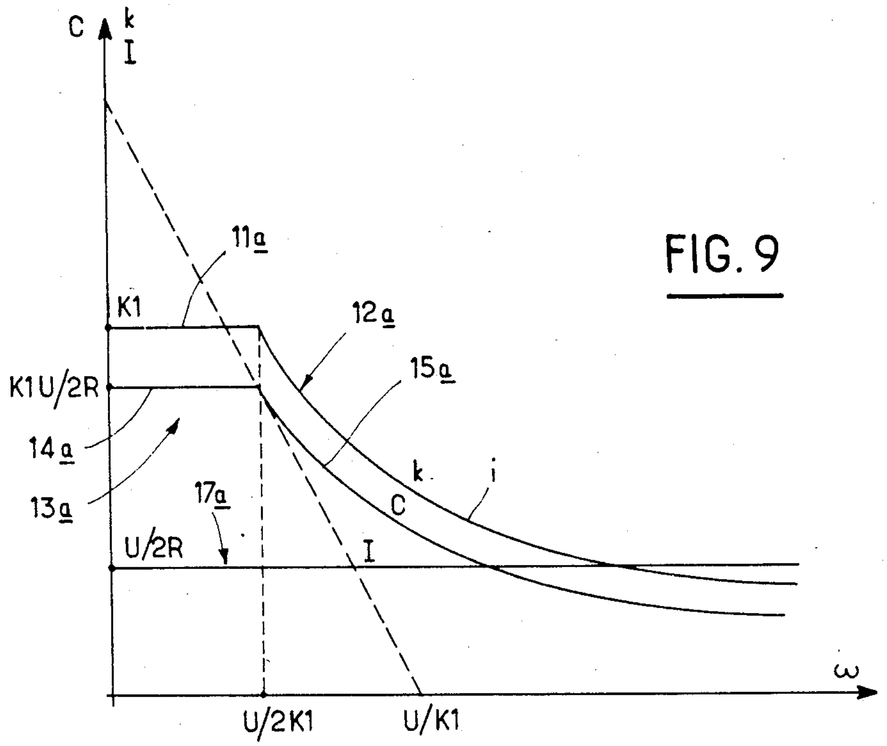
FIG. 9 is a plot of the characteristics of an electrical machine operating as a motor in accordance with the method of the invention, in which the armature voltage is controlled so as to maintain the armature current at a constant value.
Figure 10:
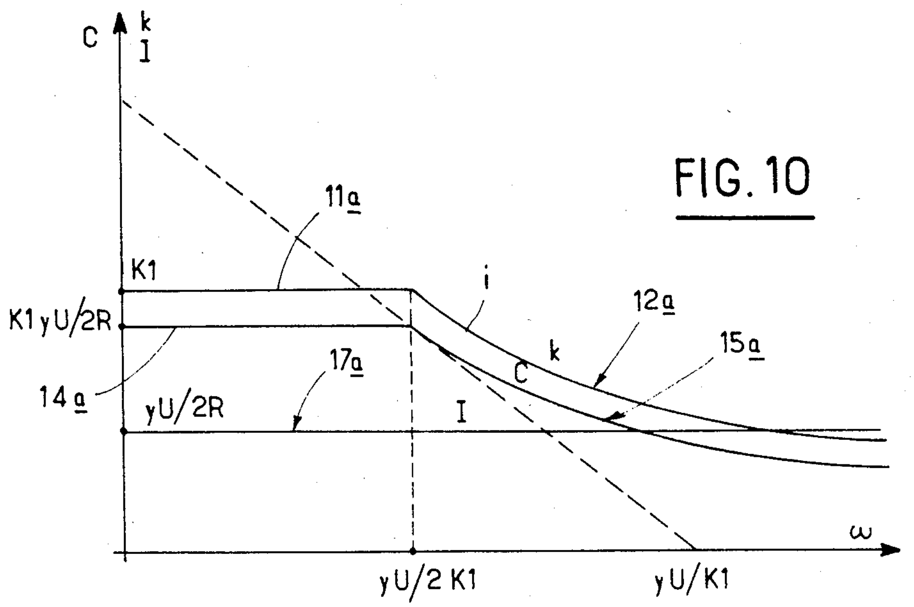

FIG. 10 follows from FIG. 9, for an armature voltage corresponding to the regulated higher voltage than that of the battery.

Figure 11:
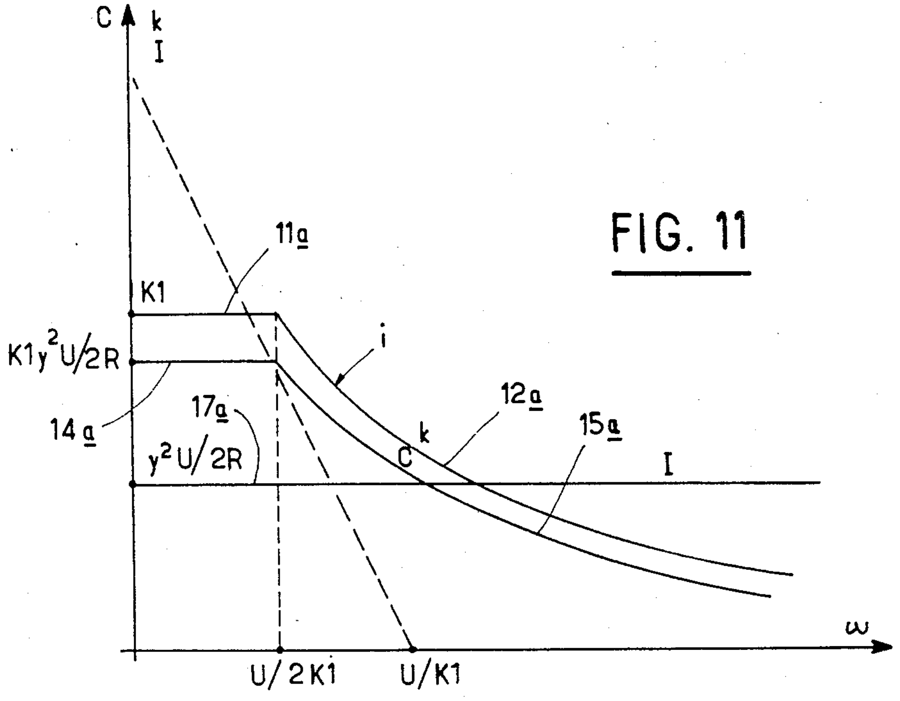

FIG. 11 follows from FIGS. 9 and 10, the armature voltage and the inductor voltage corresponding to the regulated higher voltage than that of the battery.

Figure 12:
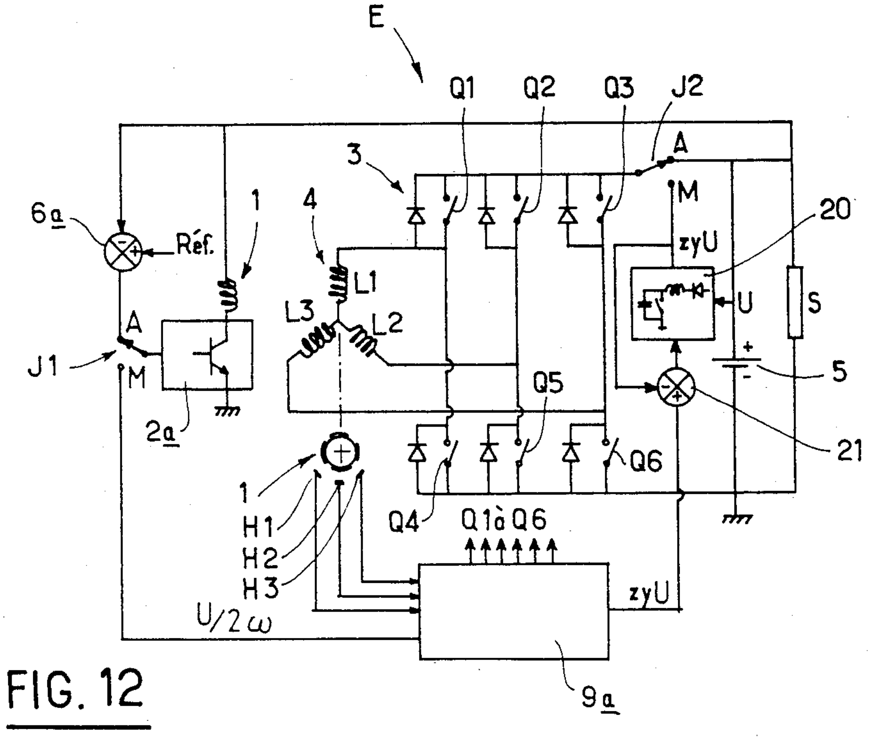

FIG. 12 is a simplified electric circuit diagram of a control system of an electrical machine in accordance with the invention.

Figure 13:
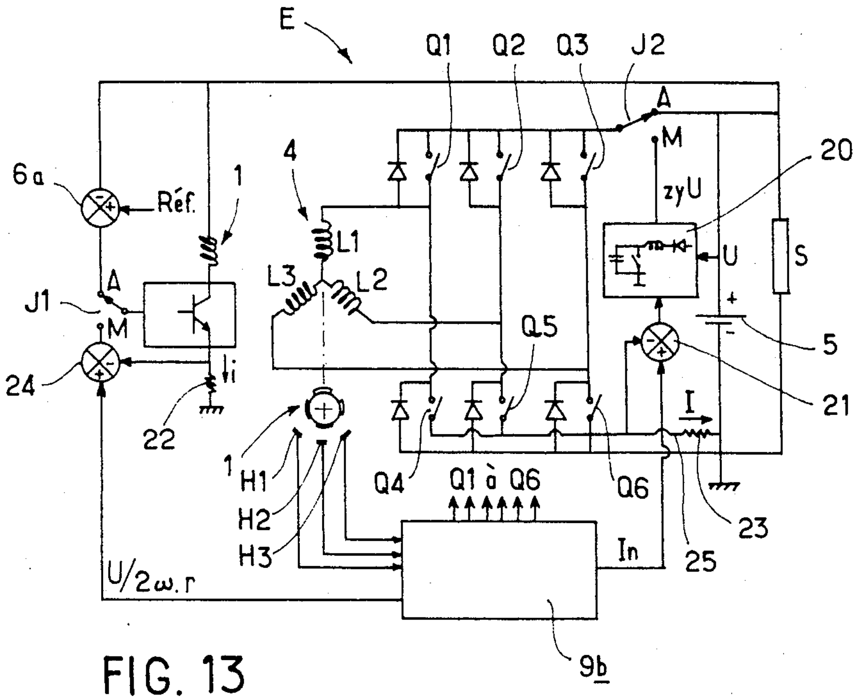

FIG. 13 is an electric circuit diagram of a variant of the control system.

Figure 14:
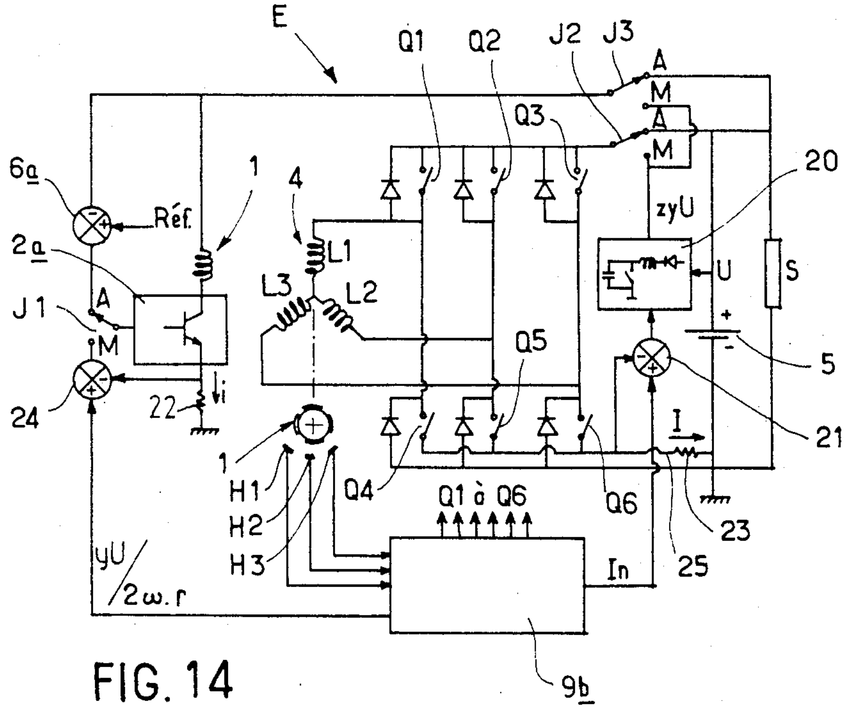

FIG. 14 is an electric circuit diagram of another variant of the control system.

Before starting on the description properly so called, it should be stated that a reversible generator—motor electrical machine for a motor vehicle of the type indicated in the invention, can be set up in two ways:

either integrated with the motor flywheel and therefore rotating at the same speed as the crankshaft of the thermal engine;

or driven by the crankshaft by means of pullies and belts at a speed higher than, and usually approximately double that of the crankshaft.

In order to simplify the text, only the first arrangement will be considered, where the speeds of rotation of the thermal engine and the electrical machine are the same. The case of the second arrangement can be deduced from the preceding one by using a simple multiplying factor between the speed of the thermal engine and that of the electrical machine.

Figure 1:
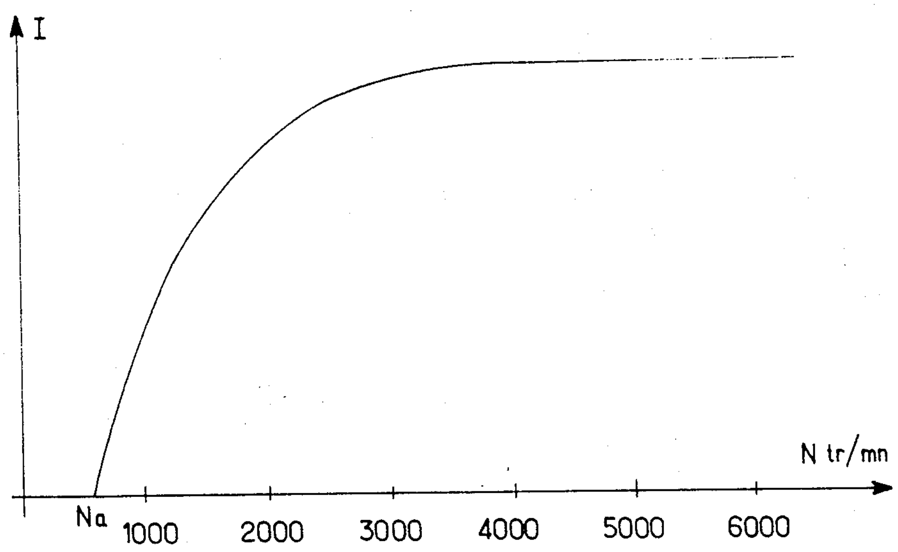
FIG. 1 illustrates a characteristic current-speed curve of an alternator, the current strength being plotted on the y axis, and the speed of rotation of the alternator, expressed in revolutions per minutre, being plotted on the x axis.

FIG. 1 of the drawings illustrates an example of the characteristics of the current strength (represented on the y axis) delivered by an alternator, integrated with the flywheel of the thermal engine, or driven by this engine with a transmission ratio of 1, with nominal excitation, as a function of the speed of rotation represented on the x axis and expressed in revolutions per minute. The starting speed Na of the alternator is in the region of 600 revolutions per minute.

Figure 2:
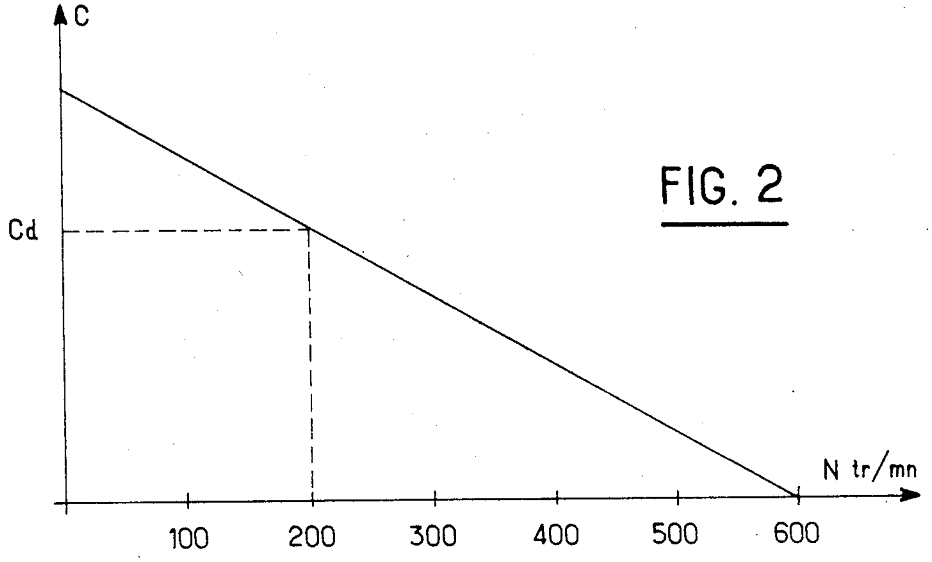
FIG. 2 illustrates a torque-speed characteristic of the electrical machine operating in the motor mode with nominal excitation and with the phase supply of the stator (or armature) provided by electronic switching at a nominal voltage, the torque being plotted on the y axis and the speed of rotation on the x axis.

FIG. 2 shows the characteristic torque (on the y axis) and speed (on the x axis) of the same electrical machine as in the case of FIG. 1, but this time operating as a motor with nominal excitation and with the stator phase supplied by electronic switching at the nominal voltage, as will be explained in some greater detail with reference to the diagrams in FIGS. 3 and 4.

Figure 3:
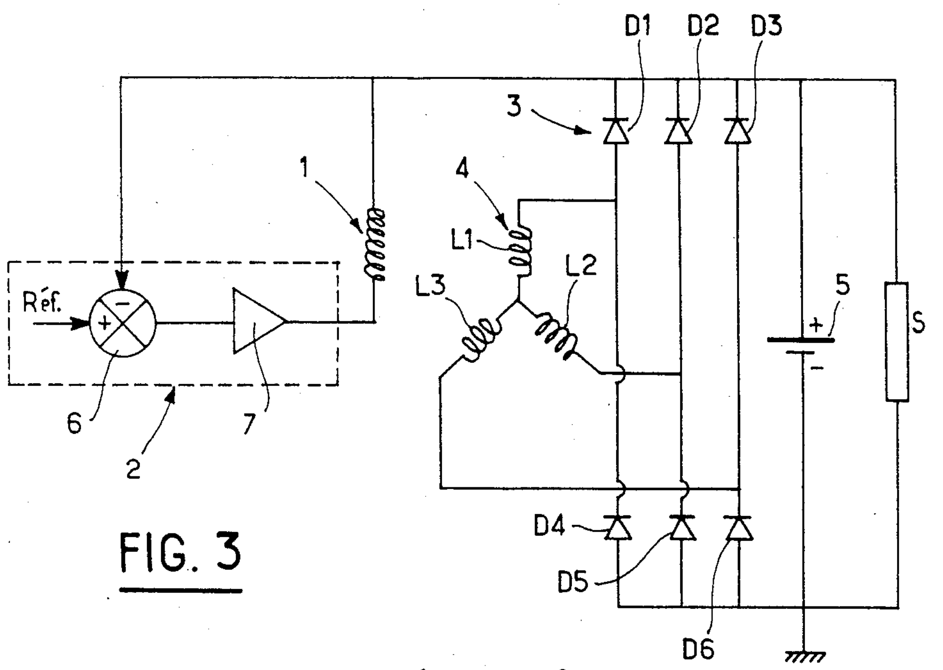
FIG. 3 is an electric circuit diagram of a conventional control system for a machine operating as an alternator.

The circuit diagram of FIG. 3 corresponds to the operation of the electrical machine as an alternator, with a conventional control system. The machine comprises an inductor winding 1, or excitation winding, controlled by a regulator 2 which controls the excitation current passing through the inductor 1, in such a way that a desired voltage is delivered at the output of the bridge 3 of rectifying diodes connected to the armature 4 comprising the three phases L1, L2, L3 in a star connection.

The diode bridge 3 consists of six diodes in the conventional manner. Two diodes are associated with each phase of the armature 4 which forms the stator of the alternator. The anode of the diodes D1, D2, D3 is connected to the output end of each winding of the phases L1, L2, L3 whereas the cathode of these diodes is connected to the + terminal of a battery 5, as well as to a terminal of the electrical power system S for the current consuming elements of the vehicle.

The cathodes of the diodes D4, D5 and D6 are connected to the output ends of the phases L1, L2, L3, whilst the anodes are connected to earth, to which the − terminal of the battery 5 and the other terminal of the power system S are also conected.

The regulator 2 comprises, schematically, a comparator circuit 6 which receives on one input, the voltage at the output of the diode bridge 3 and at another input, a reference voltage. The output signal from the comparator 6 is sent to an amplifier 7 which controls the current strength flowing in the inductor 1. It does not appear to be necessary to describe these conventional circuits in greater detail.

Figure 4:
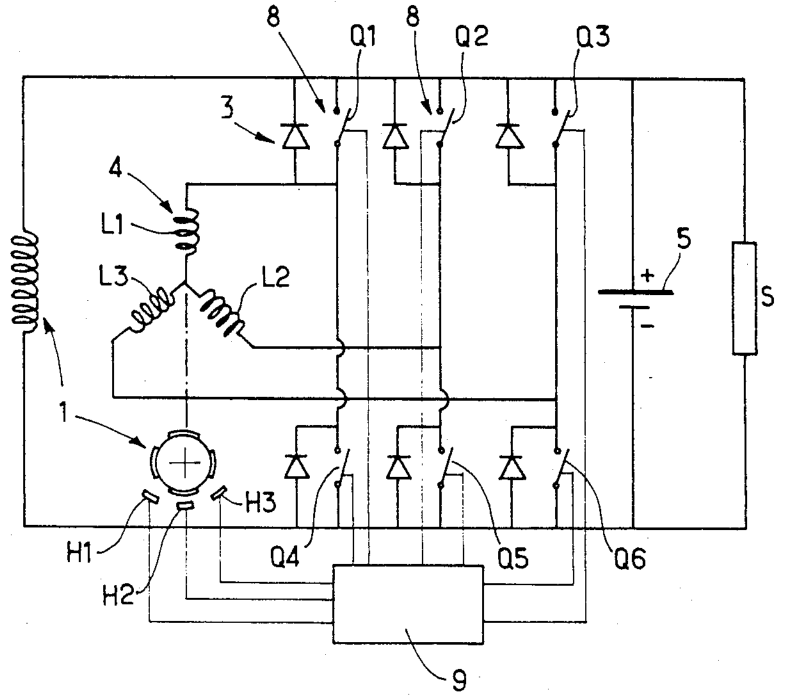
FIG. 4 is a circuit diagram of a conventional control system for an electrical machine operating as a motor, with electronic switching.

FIG. 4 schematically represents the control of the electronic switching of the electrical machine for its operation as a motor. The elements which are identical, or perform similar functions to the elements previously described with reference to FIG. 3, are designated by the same references without a repetition of their desciption.

The regulator 2 has not been represented in FIG. 4 and the inductor consisting of the excitation winding 1 is supplied at the constant voltage U of the battery.

The electronic switching means are connected in parallel to the diode bridge 3 to provide a sequential supply for the phases L1, L2, L3 of the armature 4 or stator.

The electronic switching means 8 comprise static contact breakers Q1 . . . Q6 which can be constituted by transistors or thyristors, connected in parallel to the diodes D1 . . . D6. The contact breakers Q1 . . . Q6 are controlled from an electronic module 9 which receives data on the angular position of the rotor, or inductor 1, from sensors H1, H2, H3, detecting the angular position of the rotor, which are spaced out around a circumference surrounding the rotor. These sensors H1, H2, H3 can consist of Hall Effect sensors or opto-electronic sensors.

An example of the phase supply sequence for L1, L2, L3 which permits the creation of a rotating electromagnetic field is as follows

| Electric Phase angle (degrees) | | 0 | 60 | 120 | 180 | 240 | 300 | 0 |
|---|---|---|---|---|---|---|---|---|
| Sensor state | H1 | 0 | 0 | 0 | 1 | 1 | 1 | 0 |
| | H2 | 0 | 0 | 1 | 1 | 1 | 0 | 0 |
| | H3 | 0 | 1 | 1 | 1 | 0 | 0 | 0 |
| Supply | L1 | + | + | 0 | − | − | 0 | + |
| | L2 | − | 0 | + | + | 0 | − | − |
| | L3 | 0 | − | − | 0 | + | + | 0 |

The operating characteristics of the electrical machine in the motor mode depend on the operating characteristics in the alternator mode.

Thus, if reference is again made to FIG. 2, it may be seen that the maximum speed of rotation of the motor, which is 600 revolutions per minute, corresponds to the starting speed for the operation as an alternator, as illustrated by FIG. 1, since at this speed the counter electromotive force (in motor mode) reaches the nominal voltage and completely blocks the supply current for the stator (or armature).

If the nominal current, during operation as an alternator, is sufficiently strong, the electrical machine will be capable of delivering a starting torque Cd when operating as a motor, at a speed of 200 revolutions per minute for example, which is adequate in the case where the motor is used as a starter. On the other hand, it is possible that the electrical machine whilst having satisfactory characteristics for operating as an alternator, does not deliver an adequate torque Cd when operating as a motor according to the circuit diagram of FIG. 4.

Moreover, if the electrical machine is intended to be used for re-energising an inertial flywheel when operating in the motor mode, it must reach a relatively high speed of rotation, for example 4000 revolutions per minute, which is higher than the limit speed of 600 revolutions per minute corresponding to the zero torque point, according to the diagram of FIG. 2 which itself corresponds to the operation as a motor according to the circuit connection indicated in FIG. 4.

The object of the invention is, in particular, to provide a solution to these problems, that is to say, to make it possible to obtain an electrical machine, with a sufficient rating to operate as a generator (alternator) in a motor vehicle, with satisfactory characteristics when operating as an electric motor, that is to say, as a starter and/or as a re-energising motor for an inertial flywheel.

For this purpose, the supply voltage for the armature 4 and/or the excitation (inductor 1), when operating in the motor mode is controlled, in accordance with the invention in order to obtain the desired torque-speed characteristics.

Before setting out the control method of the invention and the means used to implement this method, in greater detail, the equations describing the operation of the machine in motor mode will be considered.

When operating in motor mode, the fcem (counter electromotive force) in volts, of the machine is expressed as follows:

$$e=(N\phi/2\pi)\cdot(2p/2a)\omega=k\omega \quad (1)$$

where

ω=angular velocity in radians/secs

N=number of armature conductors

2a=number of turns on the armature winding

2p=number of inductor poles

φ=effective flux per pole in Webers.

The electromagnetic torque C, in mN, for an armature current I in amps in the armature supplied at the nominal voltage U in volts is:

$$C=(N\phi/2\pi)\cdot(2p/2a)\cdot I=kI \quad (2)$$

and $$I=(U-e/R) \quad (3)$$

(R is the armature resistance). i.e.

$$C=kI=(k/R)(U-k\omega) \quad (4)$$

When operating at the nominal voltage U with a constant nominal excitation current i (so that k=K1 constant), the characteristic of the electromagnetic torque C as a function of the speed ω is the straight line in FIG. 2. The limit speed is U/K1.

Equations (1) to (4) demonstrate that the torque C and the speed ω depend on the inductor currents, that is to say, on the current flowing in the excitation windings 1 and in the armature, that is to say, the current flowing in the windings of stator 4.

The control method according to the invention allows the modification of these torques and speeds by acting on the currents by means of controlling the supply voltage for the armature and/or the excitation.

The current control may be effected either from the nominal voltage U (voltage of the battery 5) or from the regulated voltage yU which is higher than that of the battery, and established from the voltage U by voltage step up means.

When a nominal voltage U and a higher regulated voltage yU are available, three principal modes of operation may be envisaged as follows:

Case No. 1: The inductor 1 and the armature 4 are both supplied at the nominal voltage U.

This corresponds to the configuration of FIG. 4 and to the conventional use of a reversible electrical machine in its motor mode. The torque-speed characteristic is represented by the straight line C1 in FIG. 5.

Case No. 2: The inductor 1 is supplied at the nominal voltage U, whereas the armature 4 is supplied at a voltage yU. The torque-speed characteristic is then the straight line C2 in FIG. 5. In comparison with the line C1, the increase in torque and speed is in the ratio y, because the voltage passes from the nominal value U to the value yU, whereas the coefficient K1 remains at its own value.

Case No. 3: The inductor 1 and the armature 4 are both supplied at the voltage yU.

Figure 5:
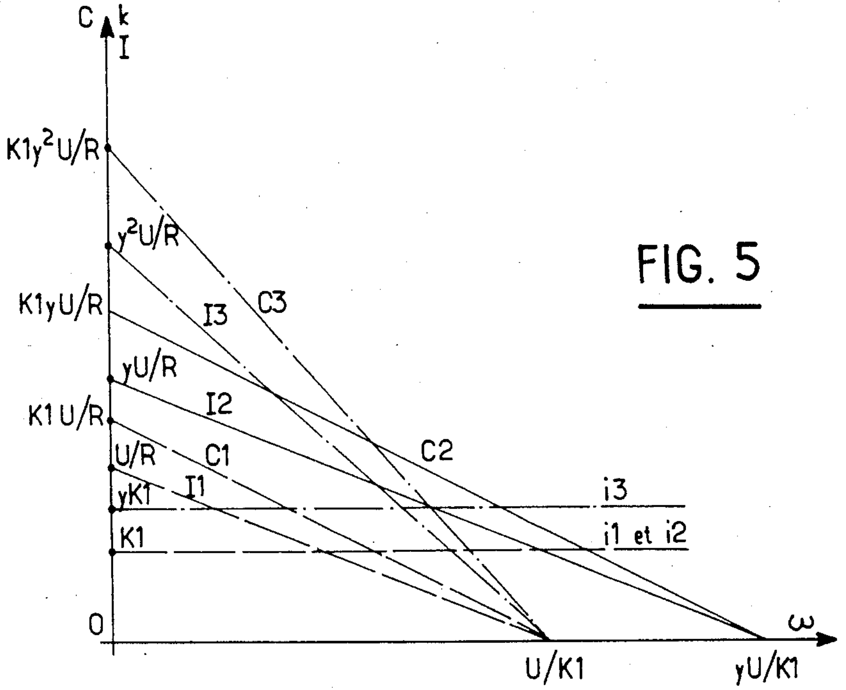
FIG. 5 is a plot of the characteristics of an electrical machine operating as a motor under various conditions, some of which conform to the method of the invention.

The torque speed characteristic is then represented by the straight line C3 in FIG. 5, the torque being multiplied by $y^2$, for the same speed of rotation, in relation to the operation corresponding to the line C1. In effect, the voltage is multiplied by y as is the ratio of proportionality which becomes yK1 instead of K1.

The speed corresponding to the zero torque point is the same in case No. 1 as in case No. 3.

To the lines C1, C2, C3, there correspond the lines i1, i2, i3 of the inductor current (winding 1) which are parallel to the x axis (inductor curent constant) and the lines I1, I2, I3 representing the armature current (winding 4), with a negative slope.

The torque-speed characteristics C2, and especially C3 (FIG. 5), allow a high torque to be obtained at relatively low speeds of rotation when the electrical machine is operating in the motor mode. These characteristics are suitable for operation as a starter, because the speed range is adequate.

Thus, by establishing a regulated voltage yU from the voltage U of the battery in accordance with the invention, which is higher than that of the battery, and by using this voltage yU at least for the supply of the armature 4 (the characteristic curve C2 in FIG. 5) and also, if required, for the supply of the inductor 1 (the straight line C3 in FIG. 5), one obtains the desired speed—torque characteristics for the electrical machine when operating as a starter.

However, as has already been stated above, if the electrical machine is used as a re-energising motor for an inertial flywheel, the speed ranges are no longer adequate.

For example, in order to reach a speed of 4000 revolutions per minute, with a torque which will be equal to 25% of the starting torque, the limit speed at the zero torque point for the line C2 of FIG. 5 would have to be 4000×(100/75)=5 333 revolutions per minute. Considering that the limit speed for the zero torque point for the line C1 is equal to 600 revolutions per minute (as in the case of FIG. 2), an amplification factor y of 8.88 would be necessary to obtain the satisfactory characteristic C3. With such a y factor of 8.88, the current in the armature 4, which increases in the same proportion, becomes very high and the cost of the electronic components (the electronic switching means8) can become exorbitant.

In order to avoid such a drawback, the method of the invention makes provision for controlling the excitation of the inductor 1 so as to produce an increase in the speed of rotation at which the motor torque is cancelled. This increase is obtained by causing the supply voltage or the current in the inductor 1 to vary in such a way that the electromagnetic flux $\phi$ varies, and therefore the coefficient k relating the counter electromotive force to the speed of rotation (see equation 1).

Preferably, the excitation control is effected so as to obtain the maximum torque for each speed of rotation.

Theoretical explanations will first be given to obtain a better understanding of the method of the invention. These theoretical explanations essentially relate to the basic case (case no. 1) which corresponds to the inductor and armature supply at the nominal voltage U. It is then simple to extrapolate to cases 2 and 3.

Reference is again made to equation (4) which gives the torque as a function of the nominal voltage, of the speed of rotation and of the coefficient K. Calculating the derivative of the torque C with respect to k, one obtains:

$$(dC/dk)=1/R(U-2k\omega) \qquad (5)$$

This derivative shows that the torque C for each speed is at a maximum when K=U/2. An optimised method to extend the speed range, that is to say to increase the speed of rotation at which the motor torque is cancelled, consists of causing k to vary according to a hyperbolic function of $\omega$. This variation of k, as stated above, will be obtained by acting on the voltage or the excitation current applied to the winding 1.

The variable k is physically limited to the value K1 for the lower speed of rotation going from zero speed, $\omega=0$ up to the velocity $\omega=\omega 1$ such that:

$$K1=(U/2\omega 1)$$

that is to say $$\omega 1=(U/2K1)$$

For the speeds of rotation exceeding $\omega 1$, k is controlled by essentially acting on the effective flux $\phi$ per pole produced by the inductor (see equation number 1), so as to have at each instant $$k=(U/2\omega)$$

and $$C=(k/R)(U-k\omega)=(U^2/4R\omega) \qquad (7)$$

Figure 6:
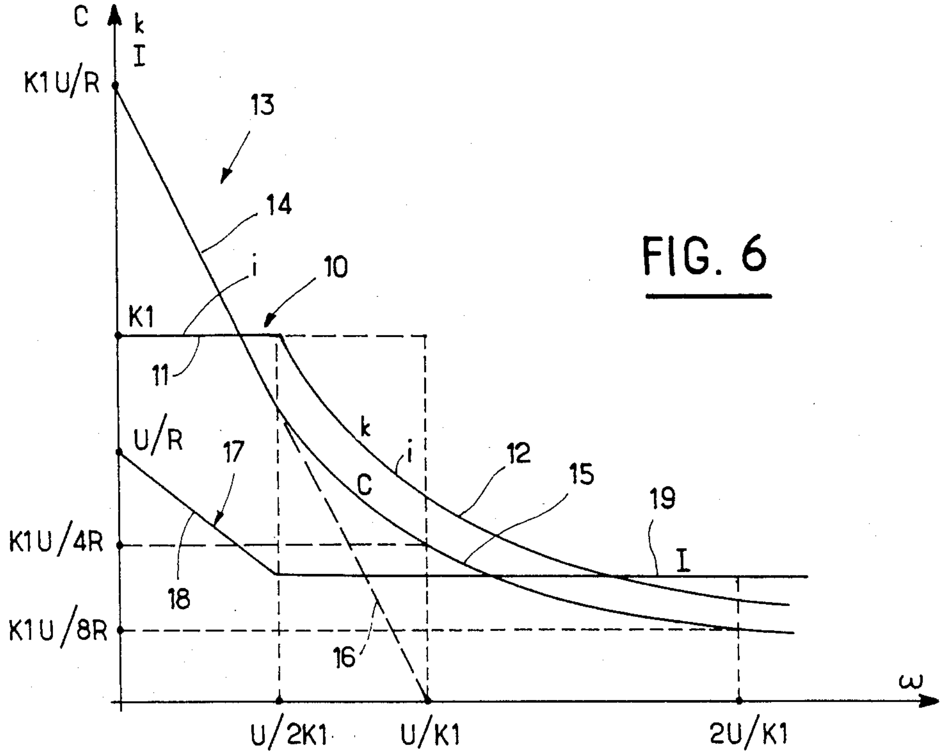
FIG. 6 is a plot of the characteristics of an electrical machine operating as a motor in which the excitation is controlled according to the invention in order to displace the speed corresponding to the zero torque point towards higher speeds.

The charcteristics of the torque C, of the armature current I (current in the stator 4) and the inductor current i (the current in the excitation windings 1) are plotted in FIG. 6.

The curve 10 showing the inductor current as a function of the speed of rotation, which corresponds to the desired excitation regulation to give the desired torque-speed characteristic, comprises firstly a straight segment 11 lying parallel to the x axis. This segment 11 corresponds to a constant current strength passing through the inductor 1; to this segment 11 there corresponds the value K1 which is constant, of the proportionality coefficient k. From the speed of $\omega=U/2K1$, the inductor current strength decreases according to a hyperbolic law, represented by the arc in curve 12. The coefficient k decreases in a similar manner.

The characteristic 13 of the torque C consists of a straight segment with a negative slope 14 from zero velocity up to U/2K1. For speeds higher than this last value, the curve 13 follows the arc of a hyperbola with the concave side facing upwards. A non zero value of the torque is thus maintained for velocities in excess of U/K1.

The dashed straight segment 16 prolonging the section 14 corresponds to the operating case illustrated in FIG. 2, in the absence of the excitation control. It will be seen that at the speed U/K1 at which the torque is cancelled in the case of operation without regulation of the excitation, the torque obtained is equal to K1U/4R.

At twice this speed, 2U/K1, the torque obtained with a controlled excitation is equal to K1U/8R.

Curve 17 illustrates the variation of the armature current I as a function of the speed of rotation.

This curve 17 comprises an initial straight segment 18 with a negative slope between zero speed and the speed of U/2K1. Above this speed, the curve continues in a straight segment 19 parallel to the x-axis, corresponding to a constant armature current strength.

The operation as set out above corresponds with the armature and inductor being supplied from the nominal voltage U.

Figure 7:
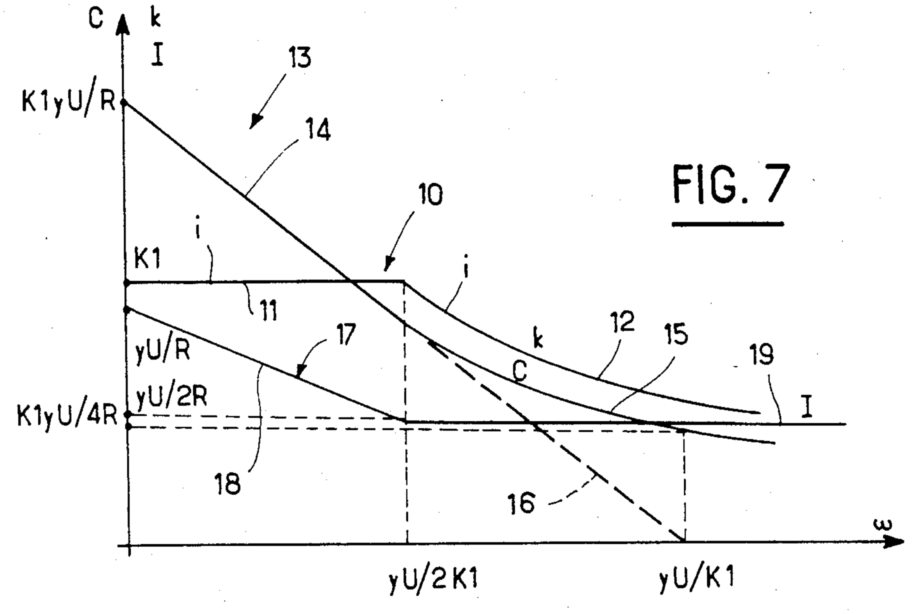
FIG. 7 is a plot of the characteristics resulting from FIG. 6, for a higher regulated armature voltage.

If the armature 4 is supplied from a regulated voltage yU, whereas the inductor 1 supply remains at the nominal voltage U, the motor operating characteristics are illustrated in FIG. 7, which follows from FIG. 6, by applying an amplification coefficient y to the values which cause the voltage U to operate. These values have been plotted on the x-axis, and the y axis, and it is not necessary to comment further in detail on FIG. 7, wherein the various components of the characteristics concerned have been designated with the same reference numerals as in FIG. 6.

Figure 8:
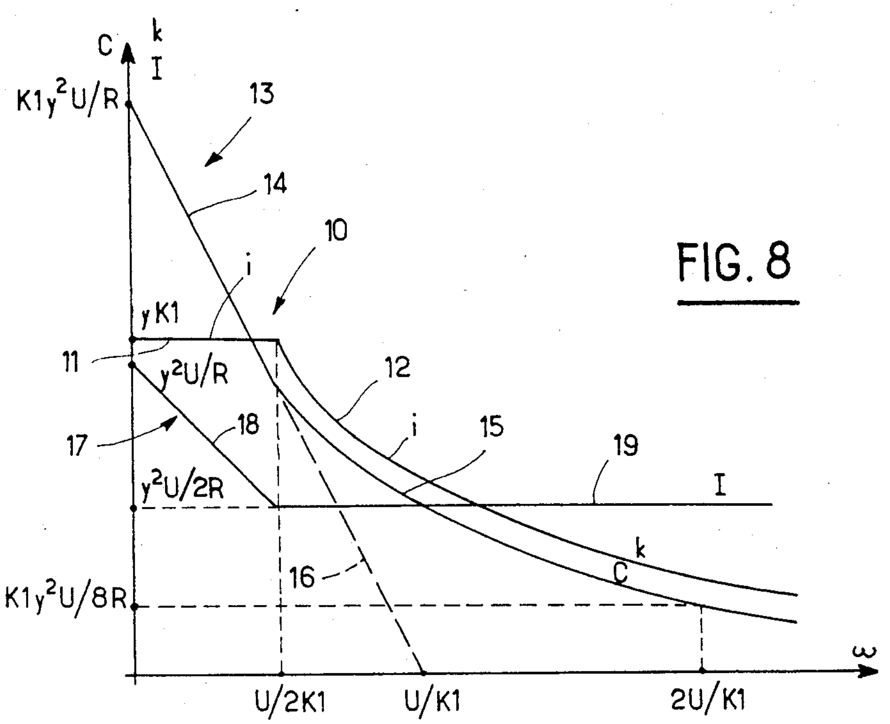
FIG. 8 is a plot of the characteristics resulting from those of FIGS. 6 and 7 when the armature and the inductor are both powered by the regulated voltage which is higher than that of the battery.

In the case of operation where the armature 4 and the inductor 1 are supplied from the voltage yU, the characteristic curves for the operation in motor mode then become those of FIG. 8 which follow from FIG. 6. The significant values have been plotted as abscissae and ordinates and expressed in terms of y, U, R and K1. The different parts of the curves have been designated by the same reference numerals as in FIG. 6.

The extension of the torque-speed characteristic by means of controlling k (regulation of the excitation) makes it possible to reduce the amplification coefficient y to obtain the desired speed of rotation. In the numerical example set out above for a desired speed of rotation of 4,000 revolutions per minute, the y coefficient can be reduced to 6.66, instead of the value of 8.88 indicated above, by means of regulating k.

Advantageously, when the electrical machine operates in the motor mode, the armature 4 is regulated so as to limit the current strength I circulating in this armature to a predetermined value for speeds of rotation ranging from zero speed to a limit speed.

Usually, as becomes apparent in FIGS. 6, 7 and 8, a start up current is set up in the armature 4, with the rotor blocked, equal to twice the minimum value of the armature current I.

The advantageous variant of the method of the invention which has just been set out above, makes it possible to limit the armature current to a single value, that is to say, its minimum value, by regulating the supply voltage of the armature 4.

In the following explanations, the basic case will be cosidered where the inductor 1 and the armature 4 are supplied from the nominal voltage U, which corresponds to the characteristics of FIG. 6.

In this FIG. 6, the minimum armature current strength I is equal to half the strength with the rotor blocked, that is to say, equal to $\frac{1}{2}\times U/R$.

As may be seen in this FIG. 6, in the speed zone corresponding to the segment 18, the armature current strength is usually higher than this minimum value.

To maintain the armature current strength I at the minimum value U/2R in the speed zone ranging from $\omega=0$ to the limit value, that is $\omega 1=U/2K1$, the supply voltage for the armature 4 is reduced from the nominal value U in a ratio z in such a way that;

$$I=(U/2R)=(zU-e/R)=(zU-k\omega/R)$$

whence $$z=(\tfrac{1}{2})+(k\omega/U) \quad (8)$$

in fact with $k=K1$.

The z coefficient must therefore vary linearly from ½ for $\omega=0$ to 1 for $\omega 1=U/2K1$.

In practice, the armature 4 is supplied at a voltage U/2 which is half the nominal value at zero speed and this voltage will be increased linearly according to ω1 up to the nominal value U attained for $\omega 1=U/2K1$. Beyond this speed of ω1, the armature 4 will remain supplied at this constant nominal voltage U.

This limitation of the armature current in the range of the speeds considered, entails a reduction of the torque C which will remain equal to the constant value:

$$C=K1\cdot I=K1(U/2R) \quad (9)$$

The characteristics of FIG. 8 are modified in the way illustrated in FIG. 9.

The characteristic 17*a* of the armature current in FIG. 9 is constituted by a straight segment parallel to the x-axis. Thus the sloping segment 18 with a negative slope of FIG. 6 has been suppressed.

For the speed ranges comprised between zero speed and U/2k1, the characteristic 13*a* of the torque has a segment parallel to the x-axis and whose ordinate is equal to K1U/2R. This ordinate is equal to half the ordinate at the origin of the torque characteristic 13 in FIG. 6. Beyond the speed of U/2K1, the torque characteristic is constituted by a hperbolic arc 15*a* similar to the arc 15 of FIG. 6.

The characteristic 12 a of armature current strength (the current in the winding 1) and of the k coefficient is similar to the characteristic 12 of FIG. 6.

The formulae (8) and (9) can be easily transposed to the cases 2 and 3 set out above.

In the case 2 corresponding to FIG. 7, where the inductor 1 is supplied from the nominal voltage U regulated according to the speed of rotation, and the armature winding 4 is supplied at the high voltage yU, the z coefficient will be able to vary linearly according to the following formula:

$$z=(\tfrac{1}{2})+(K1\omega/yU) \quad (10)$$

The torque is given by the formula:

$$C=(K1yU/2R) \quad (11)$$

The characteristics plotted in FIG. 10 correspond to this second case of operation.

In the case of operation no. 3, illustrated above in FIG. 8, where the armature 4 and the inductor 1 are supplied from the high voltage yU, the z coefficient is obtained by equation (8) given above, that is to say $$z=(\tfrac{1}{2})+(K\omega/U) \quad (8)$$

Since k is maintained to be equal to k1, the torque is given by $$C=(K1y^2U/2R) \quad (12)$$

FIG. 11 gives the characteristics corresponding to the operation according to case no. 3.

FIGS. 12 to 14 illustrate examples of embodiments of an assembly for the implementation of the method of the invention.

The practical embodiment of installations corresponding to the three cases of controlling the inductor and of the armature set out above is accomplished by means of conventional assemblies or subassemblies combined according to the method.

For the inductor 1 the usual alternator regulator 2 can be used.

For the armature 4, a power supply system with chopping may be perfectly suitable.

FIG. 12 is a block diagram of a reversible machine and of the associated control installation E making it possible to regulate the voltage of the inductor 1 supplied from the nominal voltage U and to regulate the voltage of the armature 4 supplied from the high voltage yU.

The elements of FIG. 12 which are identical with, or perform similar functions to elements already described with reference to FIG. 3 are designated by the same references, possibly followed by the letter a, thus making it possible to avoid a repetition of their description.

The installation E comprises connection means J1 and J2 in the generator position (operation of the electrical machine as an alternator) and in the motor position. These means J1 and J2 are constituted by change-over switches with two positions, A (alternator) and M (motor).

The change-over switch J1 in position A ensures a connection between an input terminal of the regulator 2*a* and the output of the comparator 6*a* which is able to compare a reference voltage with the voltage U. The other change-over switch J2, whose displacement is coupled with J1, is also in position A and in this position ensures the connection between the output of the diode bridge 3 and the + terminal of the battery.

The operation in the alternator mode of the electrical machine in this position A of the connection means J1 and J2 is conventional. The regulator 2*a* is acting on the excitation device 1 so as to charge the battery at its nominal value, for instance 14 volts or 28 volts and to provide the current for the power consumers S of the vehicle.

In its other position M, the change-over switch J1 connects the input terminal of the regulator 2*a* to a line receiving a signal representing U/ω, processed by this electronic module 9*a* from one output of the electronic control module 9*a*. This signal corresponds to the regulation defined by equation (6).

The regulator 2*a* which receives the signal representing U/2ω on its input will regulate the excitation current flowing in the winding 1 according to this relation, which makes it possible to obtain the desired regulation of the inductor.

The electronic control module 9*a* controls moreover, as has been explained with reference to FIG. 4 the power supply for the phases L1, L2, L3.

The other change-over switch J2 ensures in its M position the connection of the output of the diode bridge 3 with the output of a regulated voltage source 20, this output being at voltage zyU. The source 20 is an assembly of the power chopping type. The zy coefficient is also worked out by the electronic control module 9*a* whereof one output is connected to the input of a comparator circuit 21. This circuit receives on another input the voltage supplied at the output of the souce 20. The circuit 21 supplies at its output connected to an input of the souce 20 a signal representing the difference between the voltage delivered by the source 20 and the reference voltage zyU which regulates the source 20, so as to supply at its output a voltage equal to zyU.

It should be noted that this y coefficient can be higher than unity, or, if required, be equal to unity.

FIG. 13 schematically shows another possible embodiment of the control installation according to the invention, which installation is equivalent to that of FIG. 12, but being based this time on current regulation of the armature 4 and of the inductor 1, whereas in the case of FIG. 12 voltage regulation was effected.

The elements of FIG. 13 which are identical with, or perform similar functions to the elements of the installation of FIG. 12 are designated by the same references possibly followed by the letter b. The installation of FIG. 13 requires the use of current sensors represented by the two resistors 22, 23 placed respectively in series with the winding 1 and the armature winding 4.

The output of the electronic control module 9*b* whereon a signal U/2ωr is supplied, r being the value of the resistor 22, is connected to the M terminal of the change-over switch J1. Another input of the comparator 24 receives the voltage signal created at the terminals of the resistor 22 by the inductor current i. The comparator 21 whose output is connected to an input of the regulated voltage source 20 receives on one input a signal, processed by the electronic control module 9*b*, representing the constant 1n value, which is equal either to U/2R in the case No. 1, or yU/2R in case No. 2.

The other input of the comparator 21 receives the voltage signal collected at the terminals of the resistor 23. More precisely, this input is connected to a terminal 25 of the resistor 23 whose other terminal is earthed.

The operation of the installation of FIG. 13 is similar to that described for FIG. 12, the difference lying essentially in the regulation of the excitation current i according to the speed ω and of the armature current I which is maintained at the constant value In.

The regulation of the excitation current or of the inductor i is ensured by the regulator 2*a* in response to the output signal supplied by the comparator 24.

The regulation of the armature current I is ensured by the voltage source 20 which supplies a voltage zyU in response to the output signal of the comparator 21 so that I remains equal to In.

The type of the assembly of FIG. 13 allows the regulation of the case of operation No. 3 to be easily accomplished, which corresponds to supplying the inductor and the armature from a voltage yU.

For this purpose, as represented in FIG. 14, a third change-over switch J3, similar to J1 and J2 is provided on the conductor connecting the excitation winding 1 to the + terminal of the battery 5. This change-over switch J3 is connected so that in position A (alternator), the excitation winding 1 is supplied from the battery voltage U. In position M, this change-over switch ensures the power supply for the excitation winding from the voltage zyU supplied by the source 20.

The electronic control module 9*b* elaborates a signal In=yU/2R.

In this FIG. 14, the same references have been repeated as those used in FIG. 13 for designating the elements which are identical, or perform similar functions.

The connection means J1, J2 and J3 are connected to each other, so that they are displaced together and that they are simultaneously in position A or in position M.

The operations to be performed by the electronic control module could be advantageously ensured by a microprocessor which could take over other useful functions, such as current and voltage protection, protection against overheating and breakdown diagnostic functions.

I claim:

1. A method of controlling a reversible electrical machine, which is capable of operating either as a generator (alternator) or as a motor, intended for a motor vehicle, said method comprising providing a machine comprising an armature winding, a regulator capable of regulating the voltage delivered by the armature to the electrical system of the vehicle and an inductor winding, the inductor winding being controlled during operation as an alternator by said regulator and operating said machine as a motor by controlling at least one of the supply voltage for the armature and the excitation in order to obtain the desired torque-speed characteristics, wherein the machine is controlled to operate as a starter motor, the method including establishing a regulated voltage from the battery voltage which is higher than said battery voltage, and using this regulated voltage at least for supplying the armature with power.

2. A method according to claim 1, wherein the machine is operated as a motor and the strength of the current flowing in the armature is limited to a predetermined value for speeds of rotation ranging from zero speed to a limit value.

3. A method according to claim 1, wherein the inductor also is powered by said regulated voltage.

4. A method according to claim 1 including connecting an inertial flywheel to the machine and operating the machine in the motor mode to re-energize said inertial flywheel, said method including regulating the excitation of the inductor so as to produce an increase in the speed of rotation at which the motor torque is cancelled.

5. A method according to claim 4, wherein the excitation is so regulated as to obtain a maximum torque for each speed of rotation.

6. An electrical machine capable of operating either as an alternator or as a motor, such machine comprising an armature winding, a regulator for regulating the voltage of the electric current delivered as the output from said armature when the machine is operating as an alternator, an inductor winding, connection means in both a motor position and a generator position for enabling said machine to operate alternatively as a motor and an alternator, and control means connected to control at least one of the supply voltage for the armature and the excitation of said inductor to obtain the desired characteristics in the motor operating mode, said control means further comprising current sensors and an electronic control module which controls the armature and inductor currents to obtain the desired characteristics.

7. An electrical machine according to claim 6, wherein the electrical machine has an armature which comprises several phases and which includes an electronic switching device to ensure its operation as a motor.

8. A method of controlling a reversible electrical machine, which is capable of operating either as a generator (alternator) or as a motor, intended for a motor vehicle said method comprising providing a machine comprising an armature winding, a regulator capable of regulating the voltage delivered by the armature to the electrical system of the vehicle and an inductor winding, the inductor winding being controlled during operation as an alternator by said regulator and operating said machine as a motor by controlling at least one of the supply voltage for the armature and the excitation in order to obtain the desired torque-speed characteristics, wherein the excitation is so regulated as to obtain a maximum torque for each speed of rotation and the control is such that a coefficient (k) of proportionality between the electromotive force (e) and the speed of rotation ($\omega$) is such that $K=U/2\omega$, U representing the armature supply voltage.

9. A method of controlling a reversible electrical machine, which is capable of operating either as a generator (alternator) or as a motor, intended for a motor vehicle, said method comprising providing a machine comprising an armature winding, a regulator capable of regulating the voltage delivered by the armature to the electrical system of the vehicle and an inductor winding, the inductor winding being controlled during operation as an alternator by said regulator and operating said machine as a motor by controlling at least one of the supply voltage for the armature and the excitation in order to obtain the desired torque-speed characteristics, wherein the excitation is so regulated as to obtain a maximum torque for each speed of rotation and wherein the excitation is operated from a given speed.

10. A method of controlling a reversible electrical machine, which is capable of operating either as a generator (alternator) or as a motor, intended for a motor vehicle, said method comprising providing a machine comprising an armature winding, a regulator capable of regulating the voltage delivered by the armature to the electrical system of the vehicle and an inductor winding, the inductor winding being controlled during operation as an alternator by said regulator and operating said machine as a motor by controlling at least one of the supply voltage for the armature and the excitation in order to obtain the desired torque-speed characteristics, wherein the machine is operated as a motor and the strength of the current flowing in the armature is limited to a predetermined value for speeds of rotation ranging from zero speed to a limit value and wherein said armature current is maintained at a constant value over the whole speed range.

* * * * *